United States Patent [19]

Bonnin et al.

[11] Patent Number: 4,496,523

[45] Date of Patent: Jan. 29, 1985

[54] PROCESS FOR SEPARATING THE ACTINIDES AND LANTHANIDES PRESENT IN THE TRIVALENT STATE IN AN ACID AQUEOUS SOLUTION

[75] Inventors: Michelle Bonnin; Claude Musikas, both of Bures Sur Yvette; Pierre Vitorge, Paris, all of France

[73] Assignee: Commissariat A L'Energie Atomique, Paris, France

[21] Appl. No.: 394,491

[22] Filed: Jul. 2, 1982

[30] Foreign Application Priority Data

Jul. 9, 1981 [FR] France ................. 81 13530

[51] Int. Cl.³ .............. C01G 56/00; C01G 43/00; C01F 17/00
[52] U.S. Cl. .................. 423/9; 423/8; 423/21.5
[58] Field of Search .............. 423/8, 9, 21.5; 544/180, 181; 252/631

[56] References Cited

U.S. PATENT DOCUMENTS

| | | | |
|---|---|---|---|
| 2,877,092 | 3/1959 | Reas ................. | 423/9 X |
| 3,004,051 | 10/1961 | Hillyer et al. ......... | 423/9 |
| 3,243,254 | 3/1966 | Siddall ............... | 423/9 |
| 3,276,849 | 10/1966 | Moore ................ | 423/9 X |
| 3,294,494 | 12/1966 | Moore ................ | 423/9 X |
| 3,323,857 | 6/1967 | Bauer et al. ......... | 423/21.5 |
| 3,326,811 | 6/1967 | Healy ................. | 252/631 |
| 3,409,415 | 11/1968 | Moore ................ | 423/9 |
| 3,558,288 | 1/1971 | Burrows .............. | 423/9 X |
| 3,711,252 | 1/1973 | Roy .................. | 544/180 X |
| 3,743,696 | 7/1973 | Mason et al. ......... | 423/10 |
| 4,025,602 | 5/1977 | Campbell et al. ...... | 423/7 |
| 4,255,396 | 3/1981 | Kim .................. | 423/21.5 X |

FOREIGN PATENT DOCUMENTS

| | | |
|---|---|---|
| 1510877 | 10/1966 | France . |
| 1534888 | 6/1967 | France . |
| 1553200 | 1/1968 | France . |
| 2068159 | 7/1971 | France . |

OTHER PUBLICATIONS

*Chemical Abstracts,* vol. 75, 1971, p. 432, 70035n & Rep. 1971, RCN-141, 78 pp., A. Van Dalen: "Solvent Extraction and Inclusion Compound Formation with Dinonylnaphthalenesulfonic Acid".

Diehl, H. and G. F. Smith, "The Iron Reagents: Bathophenanthroline, 2,4,6-Tripyridyl-5-Triazine, Phenyl-2-Pyridyl Ketoxime", 1960, pamphlet published by The G. Frederick Smith Chemical Company, 52 pp.

Ejaz, M., "Studies on Extraction of Thorium by the N-Oxides of 5-(4-Pyridyl)Nonane and Trioctylamine from Different Mineral Acid Solutions and Its Separation from Rare Earth Elements and Yttrium", *Talanta,* vol. 23, pp. 193–196, 1976.

*Primary Examiner*—Deborah L. Kyle
*Assistant Examiner*—Matthew A. Thexton
*Attorney, Agent, or Firm*—Pearne, Gordon, Sessions, McCoy, Granger & Tilberry

[57] ABSTRACT

A process for the separation of the actinides and lanthanides present in the trivalent state in an acid aqueous solution, wherein the actinides present in such aqueous solution are extracted selectively in an organic solvent by bringing the solution into contact with an organic solvent comprising a first extracting agent formed by an organic bonding agent having an electron-donor nitrogen atom and a second extracting agent formed by an acid organosoluble organic compound able to exchange its H+ ions for metal ions or by metallic salt of such compound.

Application to the nuclear industry, inter alia in the field of the treatment of aqueous effluents containing lanthanides and actinides, such an transuranic elements.

8 Claims, 3 Drawing Figures

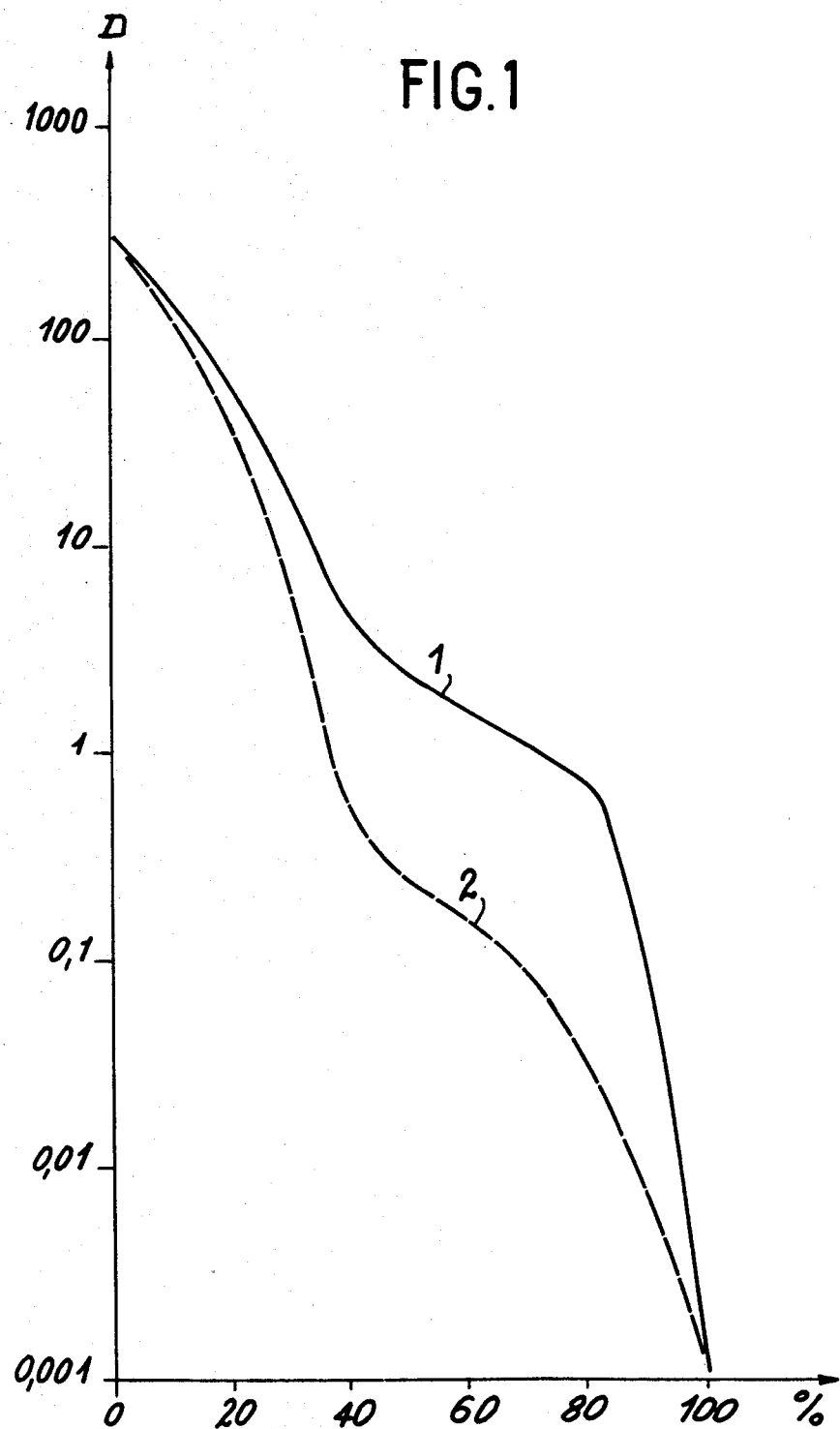

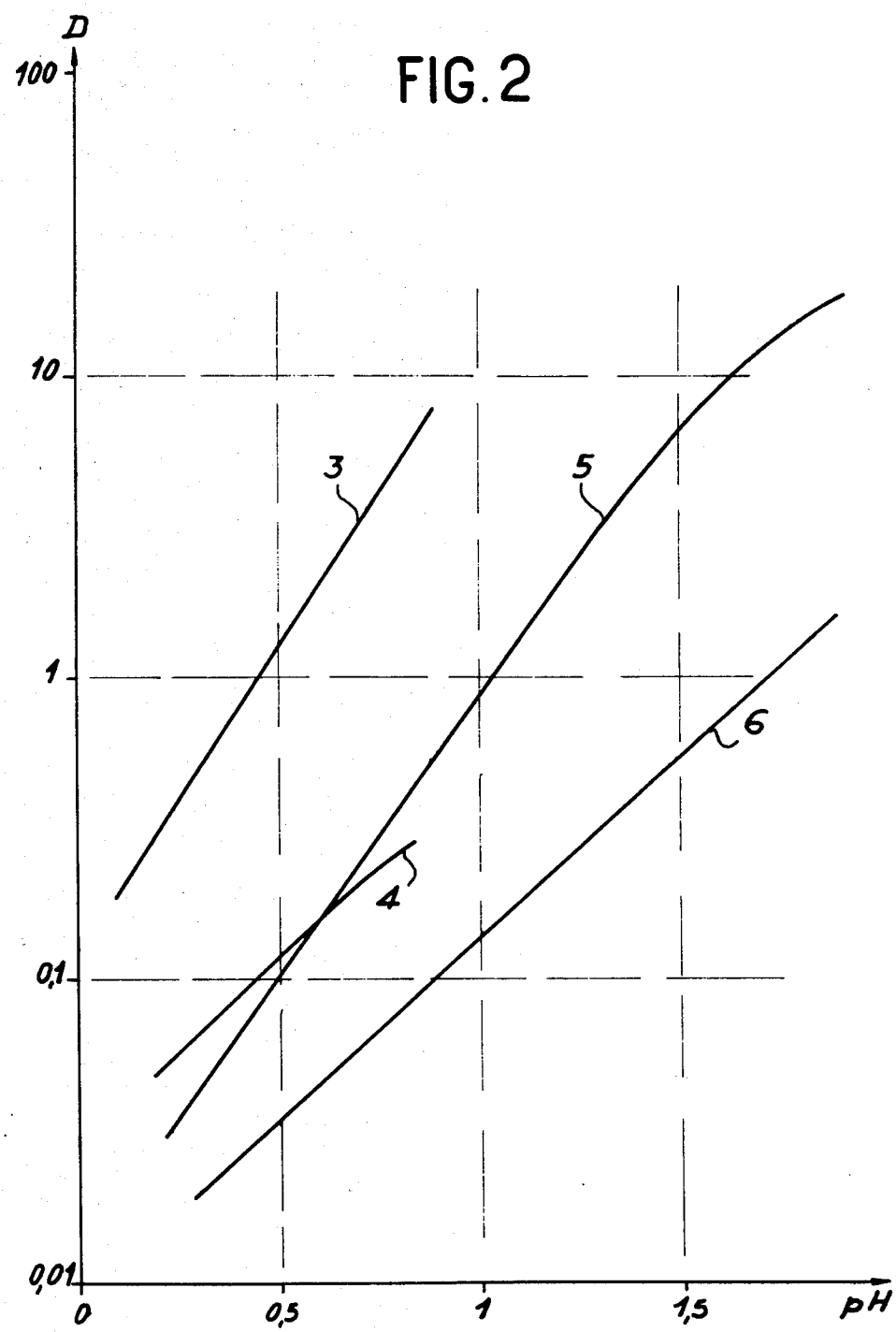

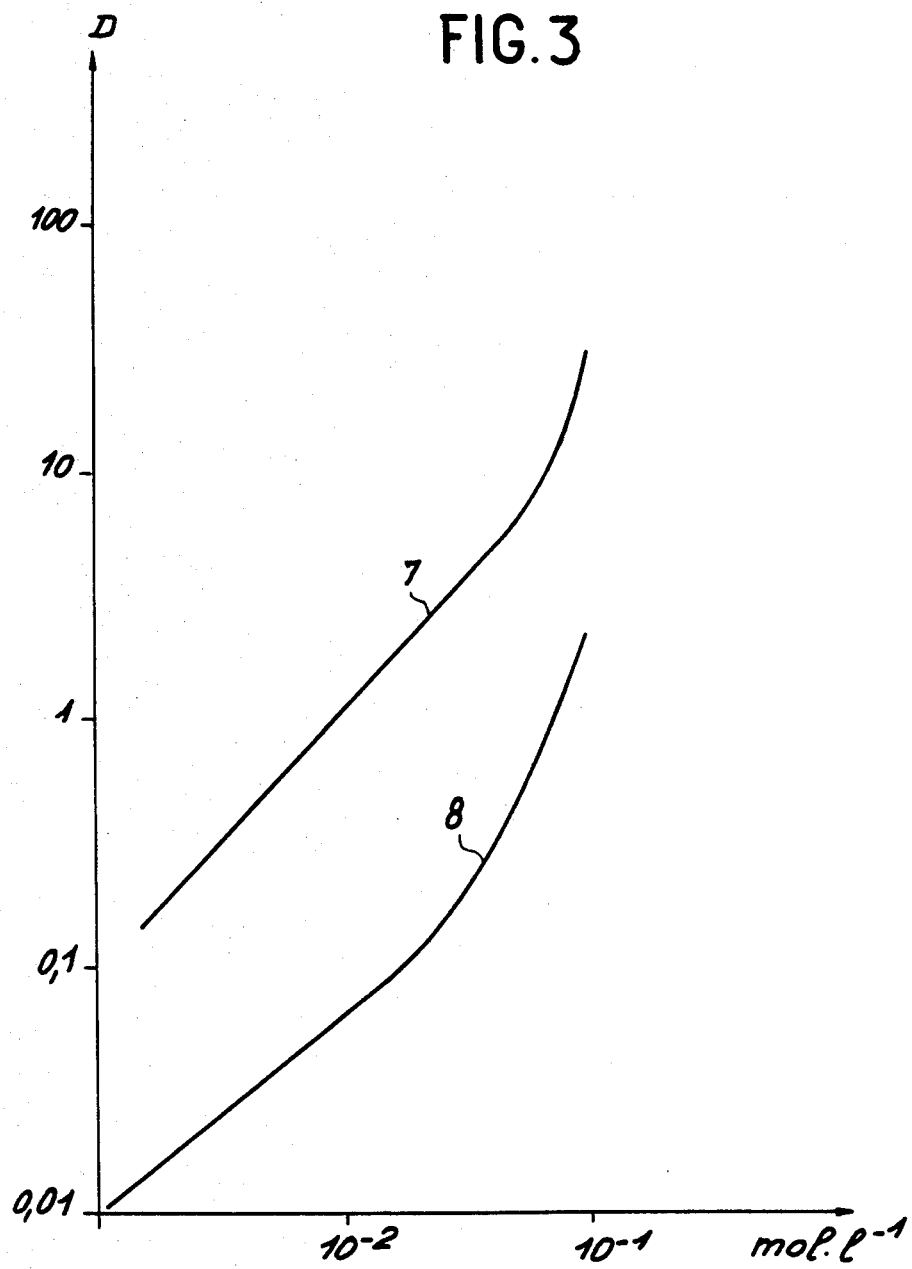

PROCESS FOR SEPARATING THE ACTINIDES AND LANTHANIDES PRESENT IN THE TRIVALENT STATE IN AN ACID AQUEOUS SOLUTION

The invention relates to a process for the separation of the actinides and lanthanides present in the trivalent state in an acid aqueous solution, which can be used inter alia for the treatment of radioactive effluents.

In the nuclear industry, inter alia in the field of the treatment of aqueous effluents containing lanthanides and actinides, such as transuranic elements, it is very advantageous to separate the actinides from the lanthanides before conditioning such radioactive wastes with a view to their long-term storage, for instance, by vitrification.

The fact is that the lanthanides which are $\beta$ and $\gamma$ emitting fission products have much shorter periods than certain actinides, which are $\alpha$ emitting elements with a much longer life. It is therefore preferable to condition wastes not containing short-life emitters which more rapidly become inactive, since this is less of a problem as regards long-term storage.

Moreover, the recovery of the actinides is very advantageous, since they can be used in various fields, for instance, for making radioactive sources. It is also very advantageous to separate the actinides from the lanthanides, on the one hand to recover the actinides, and on the other hand to treat with a view to long-term storage only the short-life fission products, which represent less danger.

Similarly the process can be applied to the production of transuranic elements by the neutron irradiation of lighter isotope targets, for instance, for the production of americium$^{241}$ and curium$^{244}$ originating from irradiated plutonium.

However, the problem of separating the actinides and the lanthanides is difficult to solve, since the lanthanide (III) ions and actinide (III) ions have very similar chemical properties, their ionic radiuses are close to one another, and the majority of complexes formed from lanthanides or actinides have a marked ionic character.

The prior art processes for separating actinides from lanthanides have numerous disadvantages, since they require the use of concentrated saline media, for instance, 10M LiCl solutions, or relatively high pH values, so that they are difficult to perform.

It is an object of the invention to provide a process for the separation of the actinides and lanthanides present in the trivalent state in an aqueous solution which obviates these disadvantages and moreover enables the actinides and lanthanides to be separated quantitatively.

In the process according to the invention for separating the actinides and the lanthanides present in the trivalent state in an acid aqueous solution, the actinides present in such aqueous solution are extracted selectively in an organic solvent by bringing the solution into contact with an organic solvent comprising a first extracting agent formed by an organic bonding agent having an electron-donor atom and a second extracting agent formed by an acid organosoluble organic compound able to exchange its H$^+$ ions for metal ions or by metallic salt of such compound.

According to an advantageous feature of the process according to the invention, the bonding agent with an electron-donor nitrogen atom forming the first extracting agent is a heterocyclic compound, such as 2,4,6-tri(2-pyridyl)-1,3,5 triazine, 1,10 orthophenanthroline and 4,7 diamyl orthophenanthroline. Preferably, use is made of 2,4,6-tri(2-pyridyl) 1,3,5 triazine (TPTZ).

According to the invention, the second extracting agent is an acid organosoluble organic compound which is capable of exchanging its H$^+$ ions for metal ions and which preferably has as low an acidity constant as possible, for example, a p$k_a$ less than 4. Use can also be made of the metal salts of the acid compounds meeting these characteristics, more particularly their alkaline metal salts, such as sodium.

Acid compounds which can be used are, for example, di-nonyl naphthalene sulphonic acid, $\alpha$-bromo caproic acid, caproic acid, and the alkaline salts of such acids.

Preferably the second extracting agent is di-nonyl naphthalene sulphonic acid (HDNNS) or sodium di-nonyl naphthalene sulphonate (NaDNNS).

Due to the use of an organic solvent containing not only a bonding agent with an electron-donor nitrogen atom, but also an acid compound, the trivalent actinide ions which are more heavily complexed than the trivalent lanthanide ions by the bonding agent having an electron-donor nitrogen atom can be extracted selectively in the organic solvent. This influence of the acid compound on extraction can be attributed to a more considerable participation of the covalent links in the stability of the actinide complexes. The fact is that the use of a second acid extracting agent able to exchange its H$^+$ ions for metal ions preserves electric neutrality between the aqueous phase and the organic phase during the formation of the complex by one of the following reaction schemes:

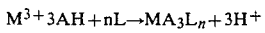

where M$^{3+}$ denotes the actinide ions, L denotes the nitrogenous bonding agent, LH denotes an acid nitrogenous bonding agent, AH denotes the organosoluble acid extracting agent and n and m denote integers.

The ML$_m$A$_{3-m}$ or MA$_3$L$_n$ complex formed is a neutral complex whose sphere of co-ordination is saturated; it will therefore possibly comprise in addition neutral molecules, such as molecules of water, or other molecules present in the medium.

To put into effect the process according to the invention as a rule the system of extracting agents is diluted in an inert solvent, such as tertiobutyl benzene.

Advantageously the concentrations of the extracting agents in the organic solvent are such that the molar ratio between the first extracting agent (the organic bonding agent with an electron-donor nitrogen atom) and the second extracting agent (the acid compound) is about 2:3 to 4:1.

It should be noted that the process according to the invention can be put into effect in any conventional extracting apparatus, such as batteries of decanting mixes, pulsed columns, centrifugal extractors, etc.

Other features and advantages of the invention will be more clearly gathered from the following description of embodiments given, of course, merely by way of non-limitative illustration, with reference to the accompanying drawings.

BRIEF DESCRIPTION OF DRAWINGS

FIG. 1 is a graph showing the variations in the coefficients of distribution D$_{Am}$ of americium (curve 1) and $D_{Eu}$ of europium (curve 2) as a function of the TPTZ and HDNNS concentrations of the organic solvent, the total concentration of extracting agents being 0.01 mole $1^{-1}$, and the aqueous solution being formed by 0.117N nitric acid, FIG. 2 is a graph showing the variations in the coefficients of distribution $D_{Am}$ (curves 3 and 5) and $D_{Eu}$ (curves 4 and 6) as a function of the pH of the aqueous starting solution for two systems of solvents, and FIG. 3 is a graph showing the variations in the coefficient of distribution of americium $D_{Am}$ (curve 7) and europium $D_{Eu}$ (curve 8) as a function of the total concentration of solvent in extracting agents.

In all the examples, tertiobutyl benzene was used as the diluting agent, and the coefficients of distribution of americium and europium were determined by gamma spectrometry. Agitation was performed for 2 minutes.

It should be noted that the coefficient of distribution of an element is equal to the ratio between the concentration of such element in the organic phase and the concentration of the same element in the aqueous phase.

EXAMPLE I

This example relates to the separation of americium (III) and europium (III) by means of an organic solvent comprising as the first extracting agent 2,4,6-tri(2 pyridyl)1,3,5-triazine (TPTZ) and as the second extracting agent di-nonyl naphthalene sulphonic acid (HDNNS), in solution in tertiobutyl benzene, the total concentration of extracting agents of the organic solvent being 0.01 mole $1^{-1}$.

To perform extraction, this organic solvent is brought into contact with a 0.117N aqueous nitric solution containing 240 mg/l of americium and 150 mg/l of europium. After agitation, and the decantation of the two phases, the americium and europium content of each phase is measured to determine the coefficients of distribution $D_{Am}$ and $D_{Eu}$.

FIG. 1 illustrates the variations in the coefficient of distribution $D_{Am}$ (curve 1) and $D_{Eu}$ (curve 2) as a function of the content of the solvent in bonding agent with an electron-donor nitrogen atom, expressed in molar percentage of the mixture of extracting agents, the total content of the solvent in extracting agents being 0.01 mole $1^{-1}$.

This figure shows that the best results are obtained when the molar ratio of the first or second extracting agents is close to 1. It will also be noted that good results are obtained when the molar ratio between the TPTZ and the HDNNS is in the range 2:3 to 4:1.

EXAMPLE 2

In this example, use is made as the solvent either of system I formed by tertiobutyl benzene containing $10^{-2}$ mole $1^{-1}$ of NaDNNS—i.e., sodium di-nonyl naphthalene sulphate and $10^{-2}$ mole $1^{-1}$ of TPTZ—i.e., system II formed by tertiobutyl benzene containing $4.10^{-3}$ mole $1^{-1}$ of HDNNS and $6.10^{-3}$ mole $1^{-1}$ of TPTZ, extraction being performed in the same conditions as those of example 1, but varying the pH of the aqueous solution of nitric acid.

The coefficients of distribution of americium and europium are determined as before. The results obtained are shown in FIG. 2, in which curves 3 and 4 illustrate respectively the variations in the coefficient of distribution $D_{Am}$ and $D_{Eu}$ as a function of the pH for solvent system no. I and curves 5 and 6 illustrate respectively the variations in the coefficient of distribution $D_{Am}$ and $D_{Eu}$ as a function of the pH for solvent system no. II.

This figure shows that the separation is better in the case of solvent system no. I, and that good results are obtained in both cases when the pH is about 1.

EXAMPLE 3

In this example the organic solvent used is tertiobutyl benzene containing TPTZ and NaDNNS, with a molar ratio of the TPTZ or NaDNNS equal to 1, and the content of solvent extracting agent is varied. Extraction is performed in the same conditions as those in Example 1, with a 0.1N aqueous nitric phase containing americium and europium. The coefficients of distribution of americium and europium are determined.

The results obtained are shown in FIG. 3, in which curves 7 and 8 illustrate respectively the variations in the coefficients of distribution $D_{Am}$ and $D_{Eu}$ as a function of total concentration in extracting agents of the organic solvent, expressed in mole $1^{-1}$.

EXAMPLE 4

In this example use is made of a battery of decanter-mixers comprising seven extraction stages and seven washing stages, an aqueous phase being made to circulate in the battery which is formed by 0.1N nitric acid containing europium, americium, cerium, gadolinium, terbium and curium in counter-current with an organic phase formed by tertiobutyl benzene containing 0.05 mole $1^{-1}$ of NaDNNS and 0.05 mole $1^{-1}$ of TPTZ, with a volumetric ratio of organic phase to aqueous phase of 0.5 in the extraction stages and 1 in the washing stages.

On leaving the battery the solvent contains 99.7% actinides and 0.05% lanthanides. In these conditions the coefficients of distribution of europium, americium, cerium III, gadolinium III, terbium III and curium III are respectively 0.4; 6.0; 0.67; 0.53; 0.3 and 4.6. In this way a satisfactory separation of the actinides and lanthanides is obtained. The actinides can be re-extracted by bringing the organic solvent into contact with a 2N aqueous nitric solution in a battery of decanter-mixers comprising 5 stages with a volumetric ratio of organic phase to aqueous phase of about 3. In these conditions the coefficient of distribution of americium is 0.015 and the organic solvent leaving the re-extraction battery will no longer contain more than about 0.001% of the actinides.

EXAMPLE 5

In this example use is made of a battery of decanter-mixers comprising 7 extraction stages and 9 washing stages. Circulating in counter-current in the battery is a 0.05N aqueous nitric solution containing americium, curium, terbium, cerium and gadolinium, and an organic solvent formed by tertiobutyl benzene containing 0.05 mole $1^{-1}$ of HDNNS and 0.05 mole $1^{-1}$ of TPTZ, with a volumetric ratio of the organic phase to the aqueous phase of 0.4 in the extraction stages and 0.2 in the washing stages.

In these conditions we obtain the following distribution coefficients: $D_{Am}=17$; $D_{Cm}=13$; $D_{Tb}=1.06$; $D_{Ce}=1.34$ and $D_{Gd}=0.6$.

We therefore obtain at the outlet from the battery a solvent containing more than 99.5% actinides and less than 0.2% lanthanides. The actinides are re-extracted in a 2N nitric solution, as in Example 4.

We claim:

1. A process for the separation of the actinides and lanthanides present in the trivalent state in an acid aqueous solution, wherein the actinides present in such aqueous solution are extracted selectively in an organic solvent by bringing the solution into contact with an organic solvent comprising a first extracting agent formed by an organic bonding agent having an electron-donor nitrogen atom and a second extracting agent formed by an acid organosoluble organic compound able to exchange its $H^+$ ions for metal ions or by metallic salt of such compound.

2. A process according to claim 1, wherein the first extracting agent is a heterocyclic organic bonding agent with an electron-donor nitrogen atom.

3. A process according to claim 2, wherein the first extracting agent is 2,4,6-tri(2-pyridyl)1,3,5-triazine.

4. A process according to claims 1 or 3, wherein the second extracting agent is di-nonyl naphthalene sulphonic acid.

5. A process according to claims 1 or 3, wherein the second extracting agent is sodium di-nonyl naphthalene sulphonate.

6. A process according to claim 1 wherein the concentrations of such extracting agents in the organic solvent are such that the molar ratio between the first and second extracting agents is about 2:3 to 4:1.

7. A process according to claim 2, wherein the heterocyclic organic bonding agent is selected from the group consisting of 2,4,6-tri(2-pyridyl)-1,3,5 triazine, 1,10 orthophenanthroline and 4,7 diamyl orthophenanthroline.

8. A process according to claim 1, wherein the acid organic compound is selected from the group consisting of di-nonyl naphthalene sulphonic acid, α-bromo caproic acid, caproic acid, and the alkaline salts of such acids.

* * * * *